Sept. 17, 1957

J. J. KURZAK 2,806,319

FISHHOOK REMOVING DEVICE

Filed Jan. 8, 1954

INVENTOR.
Joseph J. Kurzak
BY
Sam J. Slotsky
ATTORNEY 2,806,319

FISHHOOK REMOVING DEVICE

Joseph J. Kurzak, Sioux City, Iowa

Application January 8, 1954, Serial No. 402,859

1 Claim. (Cl. 43—53.5)

My invention relates to a fish hook removing device.

An object of my invention is to provide a device which is positive in operation, and which will remove a fish hook imbedded in the throat or body of the fish.

A further object of my invention is to provide a device which is easily manipulated and simple in structure.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
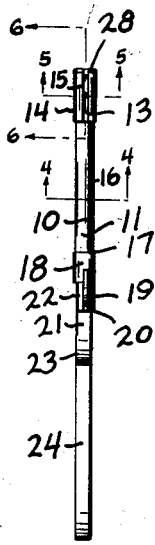
Figure 1 is a front elevation view of the device.
Figure 2:
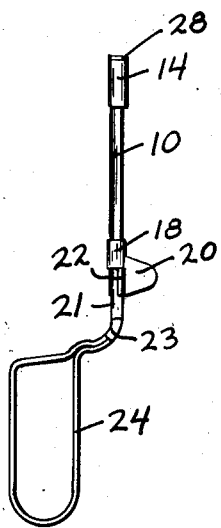
Figure 2 is a side view of the device shown in Figure 1.
Figure 3:
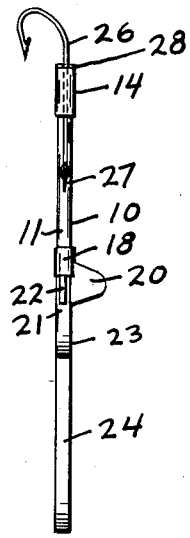
Figure 4:
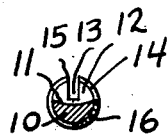
Figure 5:
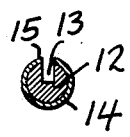
Figure 6:
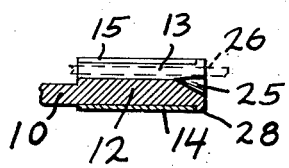

Figure 3 is a front elevation view showing how the device is clamped to the fish hook, Figure 4 is a sectional view taken along the line 4—4 of Figure 1, Figure 5 is a sectional view taken along the line 5—5 of Figure 1, and Figure 6 is a sectional view taken along the line 6—6 of Figure 1.

My invention contemplates the provision of a simple tool for removing fish hooks from a fish, which can be remotely controlled and operated.

I have used the character 10 to designate the principal shank portion of the tool which includes the slightly arcuate upper portion 11 (see Figure 4), the portion 10 merging together with the further cylindrical portion 12 having the lengthened slot 13 therein.

Mounted on the cylindrical portion 12 is a cylindrical tubular member 14 having a slot 15 formed therein adapted to normally register with the slot 13, and extending from the portion 14 along the member 10 is the arcuate portion 16 (see Fig. 4) which is connected at 17 to a cylindrical collar 18 having an extending portion 19, to which portion 19 is attached the ear 20.

The portion 10 has a cylindrical portion 21 which is received within the collar 18, and attached to the portion 21 is a limiting lug 22.

Connected at 23 to the portion 21 is the handle portion 24 which can be made of a continuous strip of material as shown, it being noted that the handle portion 24 is off-set a fairly substantial distance from the member 10.

The portion 12 includes a conical open end 25 which merges with the slot 13.

The device is used in the following manner. When the hook, which is indicated by the character 26, is imbedded in the fish's interior, the tool is placed in the mouth of the fish, with the open slots 13 and 15 being moved to receive the shank of the hook, the off-set handle 24 permitting clear visibility and allowing the operator to manipulate the tool more readily. Next, the ear 20 is forced toward the right until it occupies the position shown in Figure 3 whereby the cylindrical portion 14 will then close the lower slot 13 and the shank of the hook will thereby be firmly secured, the hook 26 and line 27 being shown in locked position in Figure 3.

This allows the operator to manipulate the hook with a rigid connection from the hand to the hook, and by merely flipping the tool slightly in the desired direction, the hook will become dis-engaged from the meaty portions of the fish and can thereby be removed.

It will be also understood that the tool can be manipulated in other ways as well if desired, and can be made of various sizes. The conical portion 25 allows the curvature of the hook to be more readily accommodated, and it will be noted that the slot 13 is located slightly above the arcuate portion 11, allowing more room for attachments to the hook.

The member 12 terminates in the shoulder 28 for retaining the cylindrical member 14 in position thereon.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A fish hook removing device comprising a forwardly extending bar, said bar being substantially of semi-circular cross-sectional configuration, a cylindrical portion forming an extension of said bar at one end and having a lengthened longitudinal slot formed therein, a cylindrical collar having a slot through a wall thereof, said collar receiving said cylindrical portion, means for rotating said collar about said cylindrical portion to retain a fish hook in the slot formed therein, said means including a lengthened extension attached to said collar, a further collar attached to said lengthened extension and receiving a portion of said bar, an ear attached to said further collar, a limiting lug attached to said bar whereby said ear will be limited in rotation thereby, and a handle member attached to said bar at the other end thereof, said handle member being substantially off-set from said bar, the slot in said cylindrical member including a conical termination.

References Cited in the file of this patent

UNITED STATES PATENTS

| 2,519,098 | Aye | Aug. 15, 1950 |
| 2,587,311 | Golnick | Feb. 26, 1952 |
| 2,644,268 | Klinicki | July 7, 1953 |

FOREIGN PATENTS

| 586,925 | Germany | Oct. 27, 1933 |
| 1,045,959 | France | July 1, 1953 |